United States Patent
Hu et al.

(10) Patent No.: US 9,883,569 B2
(45) Date of Patent: Jan. 30, 2018

(54) LAMP CONTROL SYSTEM AND CONTROL SYSTEM

(71) Applicant: Radiant Opto-Electronics Corporation, Kaohsiung (TW)

(72) Inventors: Wei-Wen Hu, Kaohsiung (TW); Peng-Hsiang Wu, Kaohsiung (TW); Jon-Hong Lin, Kaohsiung (TW); Chun-Yi Sun, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 15/141,147

(22) Filed: Apr. 28, 2016

(65) Prior Publication Data

US 2016/0323979 A1    Nov. 3, 2016

(30) Foreign Application Priority Data

Apr. 29, 2015 (TW) .............................. 104113748 A (51) Int. Cl.
| | |
|---|---|
| *H04L 29/08* | (2006.01) |
| *H05B 37/02* | (2006.01) |
| *H04L 29/06* | (2006.01) |
| *H04L 12/66* | (2006.01) |

(52) U.S. Cl.
CPC ......... *H05B 37/0272* (2013.01); *H04L 12/66* (2013.01); *H04L 67/12* (2013.01); *H04L 67/2823* (2013.01); *H04L 69/08* (2013.01)

(58) Field of Classification Search
CPC . H05B 37/0272; H04L 67/2823; H04L 67/12; H04L 12/66; H04L 69/08
See application file for complete search history.

(56) References Cited

U.S. PATENT DOCUMENTS

| | | | |
|---|---|---|---|
| 2013/0234603 A1 | 9/2013 | Van Der Veen et al. | |
| 2015/0048760 A1* | 2/2015 | Kwag | H05B 37/0272 315/297 |
| 2016/0150298 A1* | 5/2016 | Kim | H04L 43/0876 340/870.02 |

FOREIGN PATENT DOCUMENTS

| | | |
|---|---|---|
| CN | 103079313 A | 5/2013 |
| JP | 2013102307 A | 5/2013 |
| TW | I461628 B | 11/2014 |

* cited by examiner

*Primary Examiner* — Mohammad Anwar
(74) *Attorney, Agent, or Firm* — Muncy, Geissler, Olds & Lowe, P.C.

(57) ABSTRACT

A lamp control system includes at least one first lamp network, at least one second lamp network and a lamp control gateway. The first lamp network is configured to emit light and to transmit a first message, and includes a first physical layer. The second lamp network is configured to emit light and to transmit a first message, and includes a second physical layer different from the first physical layer. The lamp control gateway includes a processing module that is configured to receive the first message and the second message and to convert the first message and the second message in such a way that a first converted message and a second converted message comply with a predefined protocol.

8 Claims, 10 Drawing Sheets

LAMP CONTROL SYSTEM AND CONTROL SYSTEM

CROSS-REFERENCE TO RELATED APPLICATION

This application claims priority of Taiwanese Patent Application No. 104113748, filed on Apr. 29, 2015.

FIELD

The disclosure relates to lamp control, and more particularly to a lamp control system and a control system.

BACKGROUND

Figure 1:
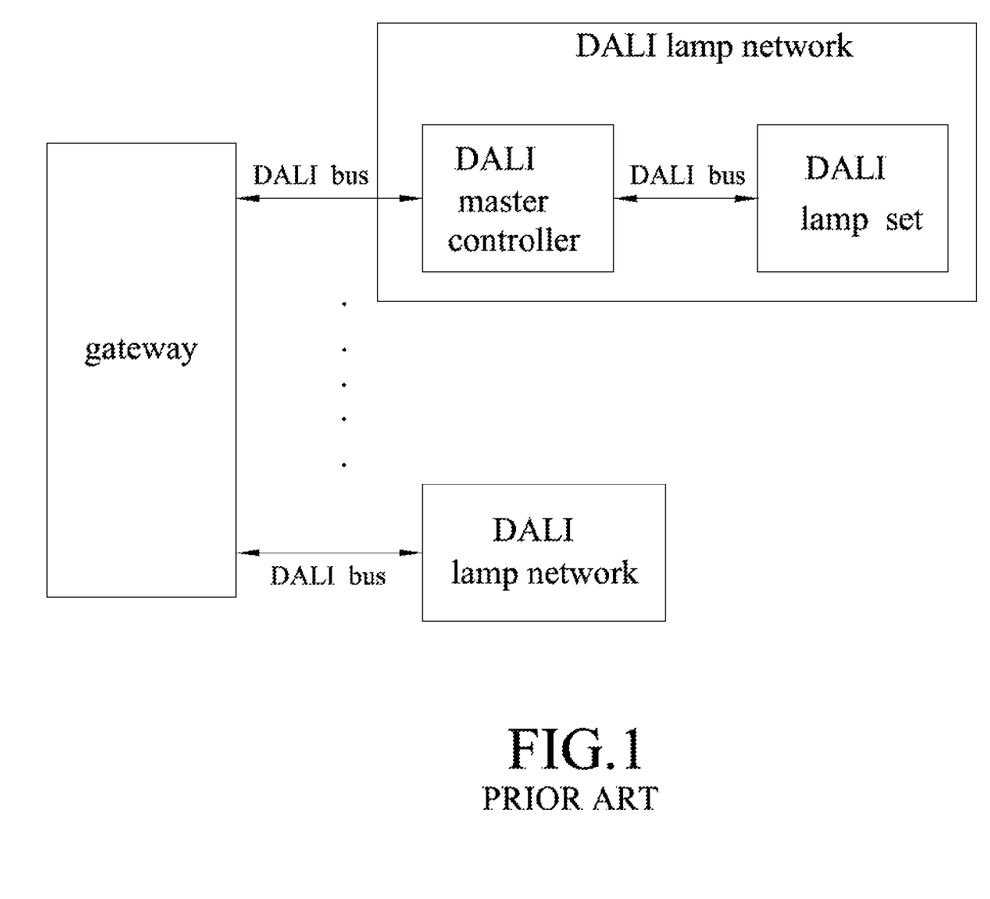
FIG. 1 is a block diagram illustrating a first conventional lamp control system.
Figure 2:
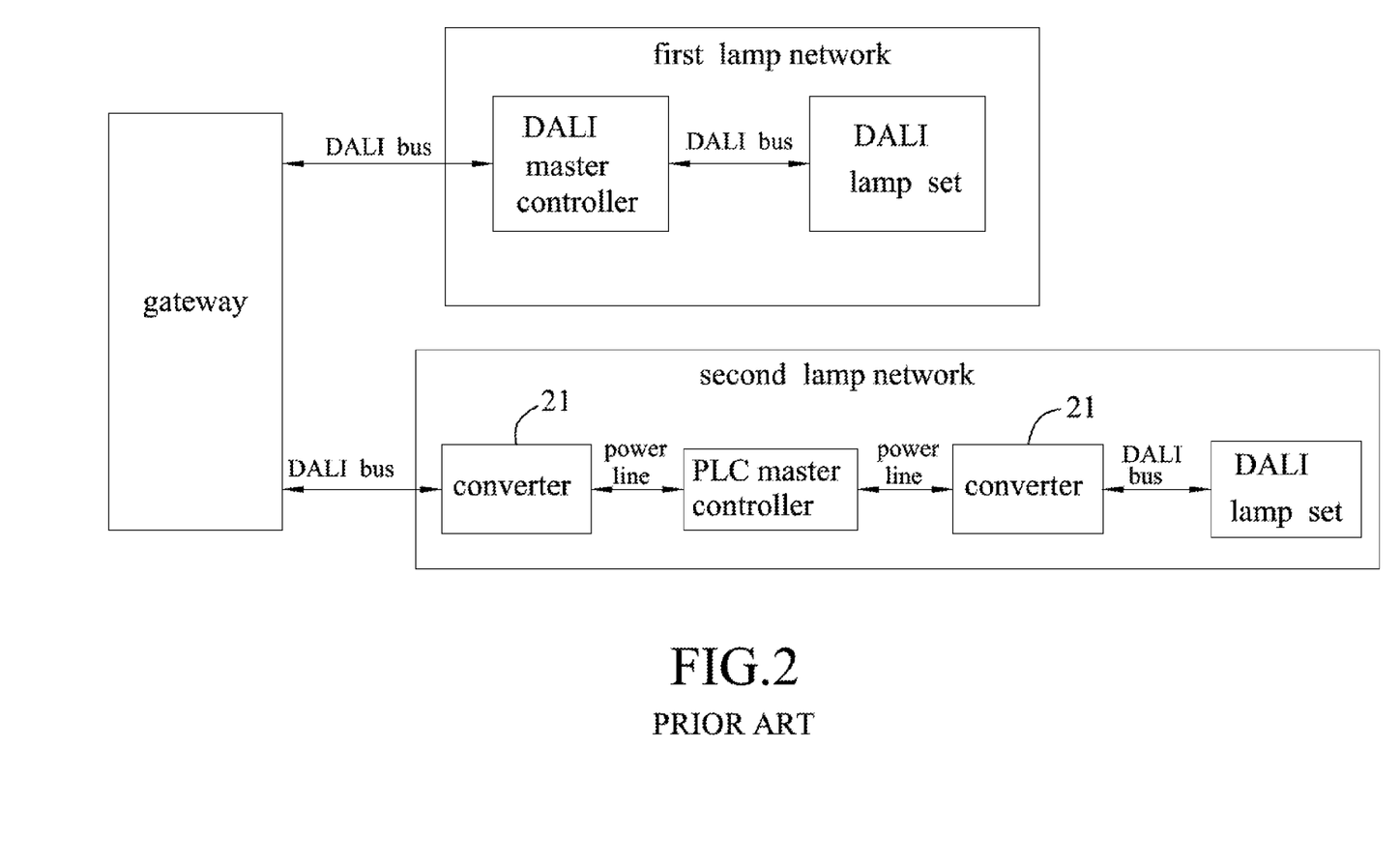
FIG. 2 is a block diagram illustrating a second conventional lamp control system.

Referring to FIG. 1, in a first conventional lamp control system, signals are disadvantageously transmitted via a single type of transmission medium (e.g., digital addressable lighting interface (DALI) buses). Referring to FIG. 2, in a second conventional lamp control system, signals are more advantageously transmitted via multiple types of transmission media (including, for example, DALI buses and power lines), but multiple converters 21 are required for signal conversion, resulting in relatively high hardware cost and relatively long signal processing time.

SUMMARY

Therefore, an object of the disclosure is to provide a lamp control system and a control system that can alleviate the drawbacks of the prior arts.

According to a first aspect of the disclosure, the lamp control system includes at least one first lamp network, at least one second lamp network and a lamp control gateway. The first lamp network is configured to emit light and to transmit a first message, and includes a first physical layer. The second lamp network is configured to emit light and to transmit a second message, and includes a second physical layer different from the first physical layer. The lamp control gateway includes a processing module that is configured to receive the first message and the second message and to convert the first message and the second message in such a way that a first converted message and a second converted message comply with a predefined protocol.

According to a second aspect of the disclosure, the lamp control system includes at least one salveslave lamp network, at least one master network and a lamp control gateway. The salveslave lamp network is configured to emit light, and includes a first physical layer. The master network includes a second physical layer different from the first physical layer, and is configured to send a command set. The lamp control gateway includes a processing module that is configured to receive the command set, to convert the command set in such a way that a converted command set complies with a predefined protocol, and to transmit the converted command set to the slave lamp network.

According to a third aspect of the disclosure, the control system includes a plurality of networks and a control gateway. At least one of the plurality of networks includes a physical layer different from that of each of remaining ones of the plurality of networks, and is configured to send a command set. The control gateway includes a plurality of transmission interfaces that are respectively coupled to the plurality of networks, and a processing module that is coupled to the plurality of transmission interfaces, and that is configured to receive the command set, and to convert the command set in such a way that a converted command set complies with a predefined protocol.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
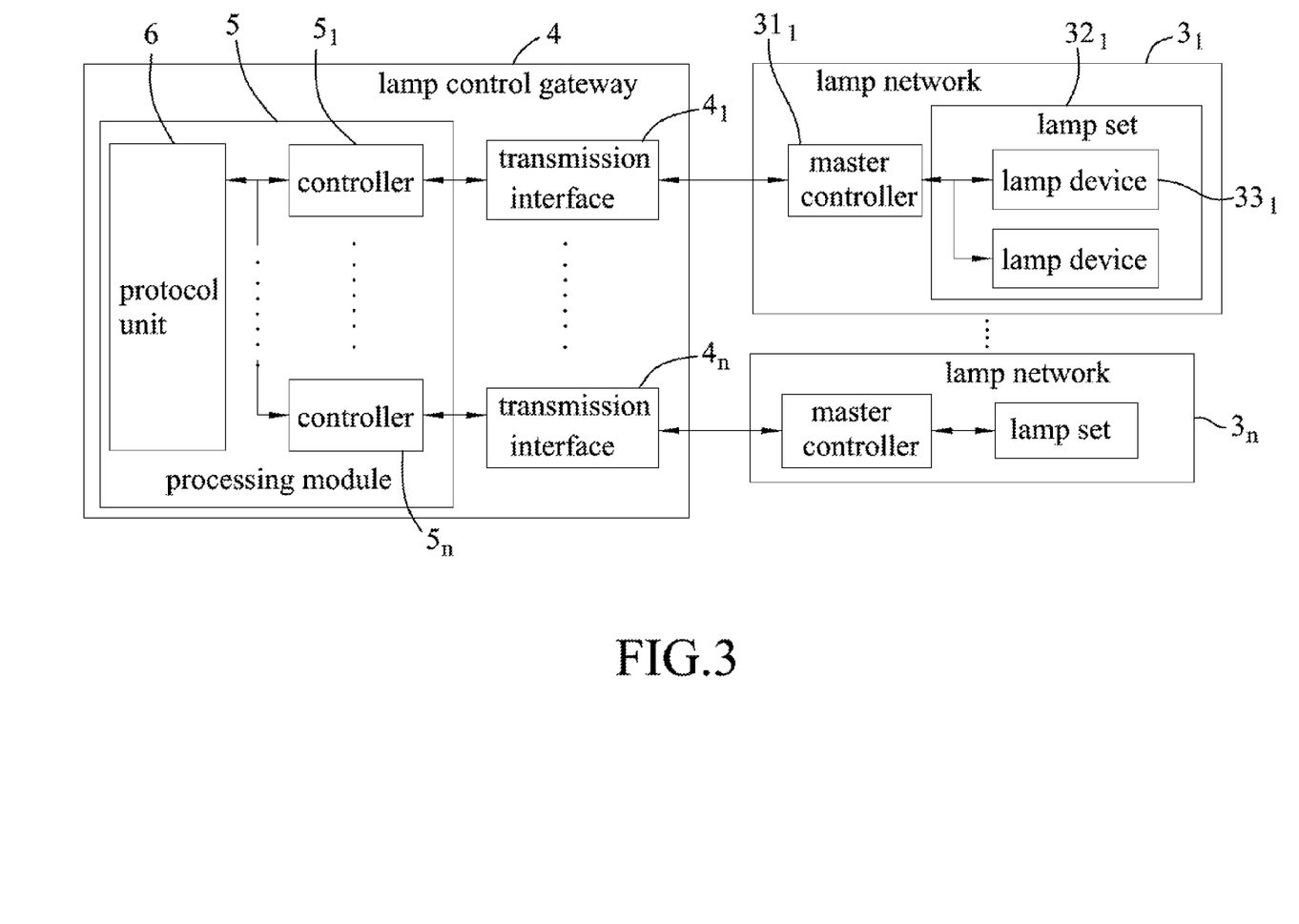
FIG. 3 is a block diagram illustrating a first embodiment of a lamp control system according to the disclosure.

Referring to FIG. 3, a first embodiment of a lamp control system according to the disclosure includes a plurality of lamp networks ($3_1$ to $3_n$) and a lamp control gateway 4. The lamp control gateway 4 includes a plurality of transmission interfaces ($4_1$ to $4_n$) and a processing module 5. The transmission interfaces ($4_1$ to $4_n$) respectively comply with different standards in physical layer, and are respectively coupled to the lamp networks ($3_1$ to $3_n$). The processing module 5 is coupled to each of the transmission interfaces ($4_1$ to $4_n$) for two-way communication therethrough with one of the lamp networks ($3_1$ to $3_n$) that is coupled thereto. In other words, each transmission interface ($4_1$ to $4_n$) transmits signals to and receives signals from the respective lamp network ($3_1$ to $3_n$) according to the respective standard.

In this embodiment, the processing module 5 includes a protocol unit 6 and a plurality of controllers ($5_1$ to $5_n$). The protocol unit 6 complies with a predefined protocol in media access control (MAC) layer. Each of the controllers ($5_1$ to $5_n$) complies with a respective one of the standards in physical layer, and is coupled between the protocol unit 6 and a corresponding one of the transmission interfaces ($4_1$ to $4_n$) that complies with the same standard. The protocol unit 6 handles, according to the predefined protocol, signal flow among the controllers ($5_1$ to $5_n$). Each of the controllers ($5_1$ to $5_n$) modulates, according to the respective standard, a signal from the protocol unit 6 and outputs a modulated signal to the corresponding one of the transmission interfaces ($4_1$ to $4_n$), and demodulates, according to the respective standard, a signal from the corresponding one of the transmission interfaces ($4_1$ to $4_n$) and outputs a demodulated signal to the protocol unit 6.

In this embodiment, each of the lamp networks ($3_1$ to $3_n$) includes a master controller $31_1$ and a lamp set $32_1$ (only those of the lamp network $3_1$ are labeled). The master controller $31_1$ of each lamp network ($3_1$ to $3_n$) complies in physical layer with the standard with which the respective one of the transmission interfaces ($4_1$ to $4_n$) complies, complies with the predefined protocol in MAC layer, and is coupled to the respective one of the transmission interfaces ($4_1$ to $4_n$) for two-way communication with the processing module 5 therethrough. The lamp set $32_1$ of each lamp network ($3_1$ to $3_n$) includes at least one lamp device $33_1$ that complies in physical layer with the standard with which the respective one of the transmission interfaces ($4_1$ to $4_n$) complies, that complies with the predefined protocol in MAC layer, and that is coupled to the master controller $31_1$ for two-way communication therewith. In other words, the master controller $31_1$ transmits signals to and receives signals from the respective transmission interface $4_1$ and the at least one lamp device $33_1$ of the lamp set $32_1$ according to the respective standard, and handles signal flow between the respective transmission interface $4_1$ and the at least one lamp device $33_1$ of the lamp set $32_1$ according to the predefined protocol, and the at least one lamp device $33_1$ of the lamp set $32_1$ transmits signals to and receives signals from the master controller $31_1$ according to the corresponding standard, and acts in response to each received signal according to the predefined protocol.

Figure 4:
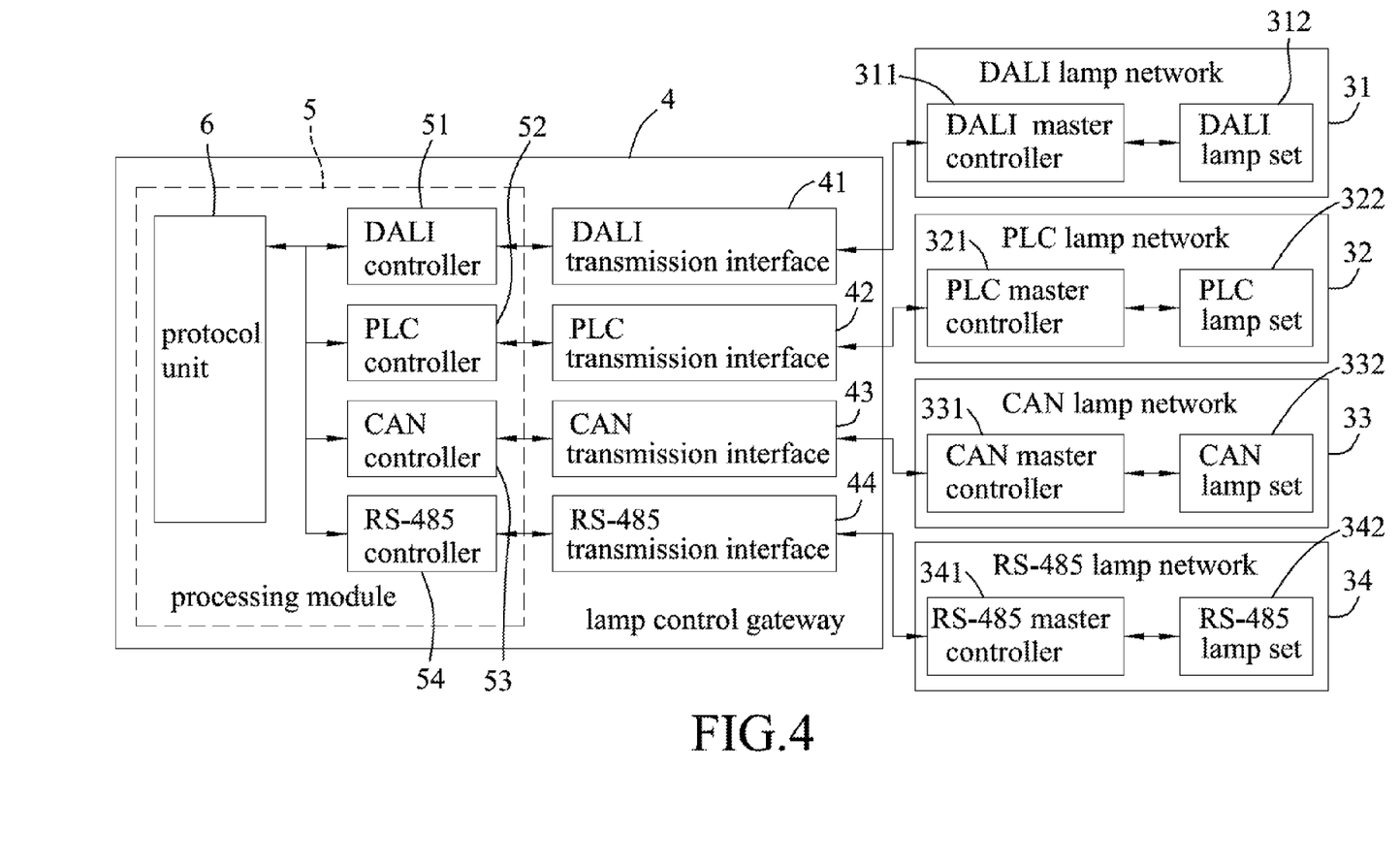
FIG. 4 is a block diagram illustrating a first exemplary implementation of the lamp control system of the first embodiment.

FIG. 4 illustrates a first exemplary implementation of the lamp control system of this embodiment. In the first exemplary implementation, the standards include standards of digital addressable lighting interface (DALI), power line communication (PLC), controller area network (CAN) and RS-485, and the predefined protocol is a protocol of DALI.

In addition, the controllers respectively complying with the standards of DALI, PLC, CAN and RS-485 in physical layer are respectively referred to as a DALI controller 51, a PLC controller 52, a CAN controller 53 and an RS-485 controller 54; the transmission interfaces respectively complying with the standards of DALI, PLC, CAN and RS-485 in physical layer are respectively referred to as a DALI transmission interface 41, a PLC transmission interface 42, a CAN transmission interface 43 and an RS-485 transmission interface 44; the master controllers respectively complying with the standards of DALI, PLC, CAN and RS-485 in physical layer are respectively referred to as a DALI master controller 311, a PLC master controller 321, a CAN master controller 331 and an RS-485 master controller 341; each lamp set, the at least one lamp device (not shown) of which complies with a respective one of the standards of DALI, PLC, CAN and RS-485 in physical layer, is referred to as a respective one of a DALI lamp set 312, a PLC lamp set 322, a CAN lamp set 332 and an RS-485 lamp set 342; the lamp network including the DALI master controller 311 and the DALI lamp set 312 is referred to as a DALI lamp network 31; the lamp network including the PLC master controller 321 and the PLC lamp set 322 is referred to as a PLC lamp network 32; the lamp network including the CAN master controller 331 and the CAN lamp set 332 is referred to as a CAN lamp network 33; and the lamp network including the RS-485 master controller 341 and the RS-485 lamp set 342 is referred to as an RS-485 lamp network 34.

In the implementation shown in FIG. 4, four different types of transmission media, including DALI buses, power lines, CAN buses and RS-485 buses, are used. The DALI buses are used for signal transmission between the DALI transmission interface 41 and the DALI master controller 311 and between the DALI master controller 311 and the at least one lamp device (not shown) of the DALI lamp set 312. The power lines are used for signal transmission between the PLC transmission interface 42 and the PLC master controller 321 and between the PLC master controller 321 and the at least one lamp device (not shown) of the PLC lamp set 322. The CAN buses are used for signal transmission between the CAN transmission interface 43 and the CAN master controller 331 and between the CAN master controller 331 and the at least one lamp device (not shown) of the CAN lamp set 332. The RS-485 buses are used for signal transmission between the RS-485 transmission interface 44 and the RS-485 master controller 341 and between the RS-485 master controller 341 and the at least one lamp device (not shown) of the RS-485 lamp set 342.

Figure 5:
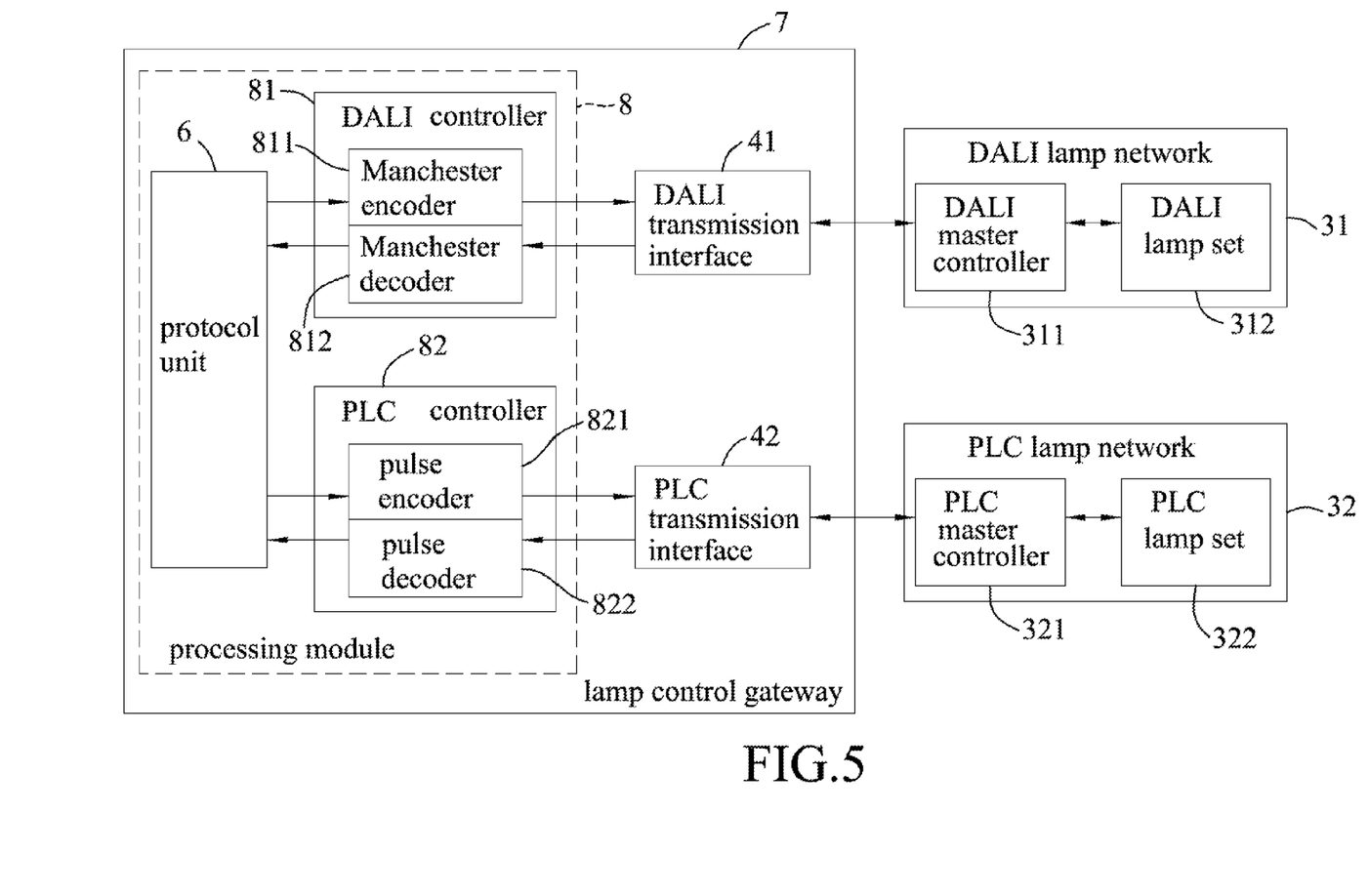
FIG. 5 is a block diagram illustrating a second exemplary implementation of the lamp control system of the first embodiment.

FIG. 5 illustrates a second exemplary implementation of the lamp control system of this embodiment. In the second exemplary implementation, the standards include standards of DALI and PLC, and the predefined protocol is a protocol of DALI.

In addition, the controllers respectively complying with the standards of DALI and PLC in physical layer are respectively referred to as a DALI controller 81 and a PLC controller 82; the transmission interfaces respectively complying with the standards of DALI and PLC in physical layer are respectively referred to as a DALI transmission interface 41 and a PLC transmission interface 42; the master controllers respectively complying with the standards of DALI and PLC in physical layer are respectively referred to as a DALI master controller 311 and a PLC master controller 321; each lamp set, the at least one lamp device (not shown) of which complies with a respective one of the standards of DALI and PLC in physical layer, is referred to as a respective one of a DALI lamp set 312 and a PLC lamp set 322; the lamp network including the DALI master controller 311 and the DALI lamp set 312 is referred to as a DALI lamp network 31; and the lamp network including the PLC master controller 321 and the PLC lamp set 322 is referred to as a PLC lamp network 32.

Moreover, the DALI controller 81 includes a Manchester encoder 811 and a Manchester decoder 812, and the PLC controller 82 includes a pulse encoder 821 and a pulse decoder 822. The Manchester encoder 811 is coupled between the protocol unit 6 and the DALI transmission interface 41, and modulates, according to the standard of DALI, the signal from the protocol unit 6 and outputs the modulated signal to the DALI transmission interface 41. The Manchester decoder 812 is coupled between the protocol unit 6 and the DALI transmission interface 41, and demodulates, according to the standard of DALI, the signal from the DALI transmission interface 41 and outputs the demodulated signal to the protocol unit 6. The pulse encoder 821 is coupled between the protocol unit 6 and the PLC transmission interface 42, and modulates, according to the standard of PLC, the signal from the protocol unit 6 and outputs the modulated signal to the PLC transmission interface 42. The pulse decoder 822 is coupled between the protocol unit 6 and the PLC transmission interface 42, and demodulates, according to the standard of PLC, the signal from the PLC transmission interface 42 and outputs the demodulated signal to the protocol unit 6.

In the implementation shown in FIG. 5, two different types of transmission media, including DALI buses and power lines, are used. The DALI buses are used for signal transmission between the DALI transmission interface 41 and the DALI master controller 311 and between the DALI master controller 311 and the at least one lamp device (not shown) of the DALI lamp set 312. The power lines are used for signal transmission between the PLC transmission interface 42 and the PLC master controller 321 and between the PLC master controller 321 and the at least one lamp device (not shown) of the PLC lamp set 322.

Referring back to FIG. 3, in this embodiment, when the master controller of a first one of the lamp networks ($3_1$ to $3_n$) (e.g., the DALI master controller 311 of the DALI lamp network 31 shown in FIG. 4 or 5) sends a query signal to the lamp set of a second one of the lamp networks ($3_1$ to $3_n$) (e.g., the PLC lamp set 321 of the PLC lamp network 32 shown in FIG. 4 or 5) for enabling the lamp set of the second lamp network to send a response signal to the master controller of the first lamp network, this query action is deemed valid if a time period from the output of the query signal by the master controller of the first lamp network to the receipt of the response signal by the same is within a range from 2.9 ms to 9.17 ms as specified by a lamp control standard, and is otherwise deemed invalid. Since converters are not required by the lamp control system of this embodiment, processing time of each of the query and response signals is relatively short, and thus the aforesaid timing requirement can be met easily.

Figure 6:
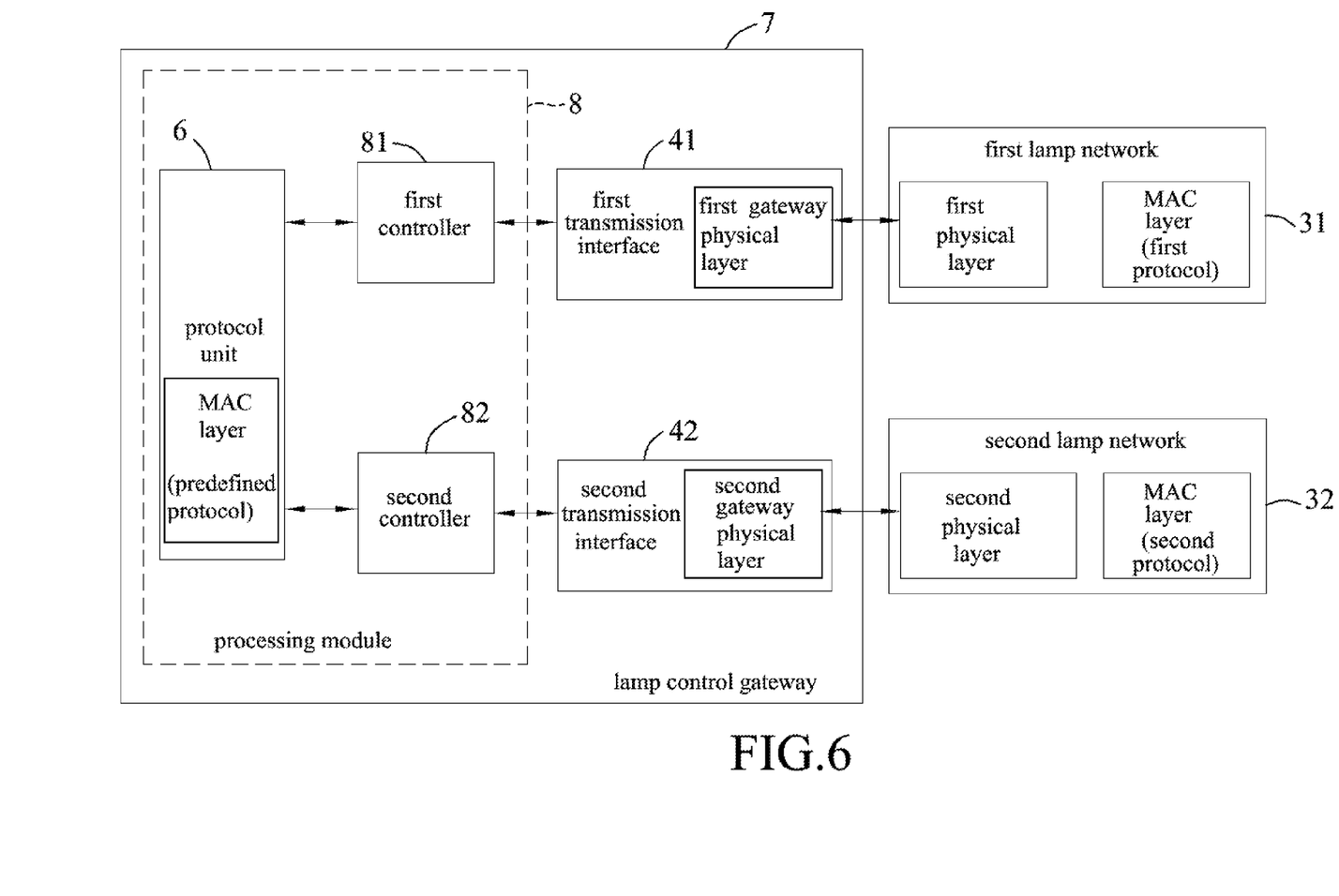
FIG. 6 is a block diagram illustrating a second embodiment of a lamp control system according to the disclosure.

Referring to FIG. 6, a second embodiment of a lamp control system according to the disclosure is a modification of the first embodiment, and includes at least one first lamp network 31, at least one second lamp network 32 and a lamp control gateway 7.

The first lamp network 31 is configured to emit light and to transmit a first message, and includes a first physical layer. The second lamp network 32 is configured to emit light and to transmit a first message, and includes a second physical layer different from the first physical layer.

The lamp control gateway 7 includes at least one first transmission interface 41, at least one second transmission interface 42 and a processing module 8.

The first transmission interface 41 includes a first gateway physical layer that complies with a standard with which the first physical layer of the first lamp network 31 complies, and is coupled between the processing module 8 and the first lamp network 31.

The second transmission interface 42 includes a second gateway physical layer that complies with a standard with which the second physical layer of the second lamp network 32 complies, and is coupled between the processing module 8 and the second lamp network 32.

The processing module 8 communicates with the first lamp network 31 and the second lamp network 32 respectively through the first transmission interface and the second transmission interface 42. The processing module 8 is configured to receive the first message and the second message and to convert the first message and the second message in such a way that a first converted message and a second converted message comply with a predefined protocol. As a result, messages in different protocol languages (e.g., the first message and the second message) that are respectively transmitted by different lamp networks (e.g., the first lamp network 31 with the first physical layer and the second lamp network 32 with the second physical layer) could be converted by a single lamp control gateway (e.g., the lamp control gateway 7) based on same protocol language information in accordance with the predefined protocol.

In this embodiment, the processing module 8 includes a protocol unit 6, at least one first controller 81 and at least one second controller 82.

The protocol unit 6 includes a media access control (MAC) layer that complies with the predefined protocol.

The first controller 81 is coupled between the protocol unit 6 and the first transmission interface 41.

The second controller 82 is coupled between the protocol unit 6 and the second transmission interface 42.

Each of the first controller 81 and the second controller 82 modulates a signal from the protocol unit 6 and outputs a modulated signal to the first transmission interface 41 and/or the second transmission interface 42 (e.g., the first controller 81 outputs the modulated signal directly to the first transmission interface 41 and indirectly to the second transmission interface 42), and demodulates a signal (e.g., the first message and/or the second message) from the first transmission interface 41 and the second transmission interface 42 and outputs a demodulated signal to the protocol unit 6 for subsequent conversion into a converted signal (e.g., the first converted message and/or the second converted message).

In one exemplary implementation of this embodiment, the first lamp network 31 has a MAC layer that complies with a first protocol, the second lamp network 32 has a MAC layer that complies with a second protocol different from the first protocol, and the predefined protocol is different from the first and second protocols. For example, the predefined protocol is a protocol of DALI, the first protocol is a protocol of PLC, and the second protocol is a protocol of CAN.

In another exemplary implementation of this embodiment, the first lamp network 31 has a MAC layer that complies with a first protocol, the second lamp network 32 has a MAC layer that complies with a second protocol different from the first protocol, and the predefined protocol is identical with one of the first and second protocols. For example, the predefined protocol is a protocol of DALI, the first protocol is a protocol of DALI, and the second protocol is a protocol of CAN.

Figure 7:
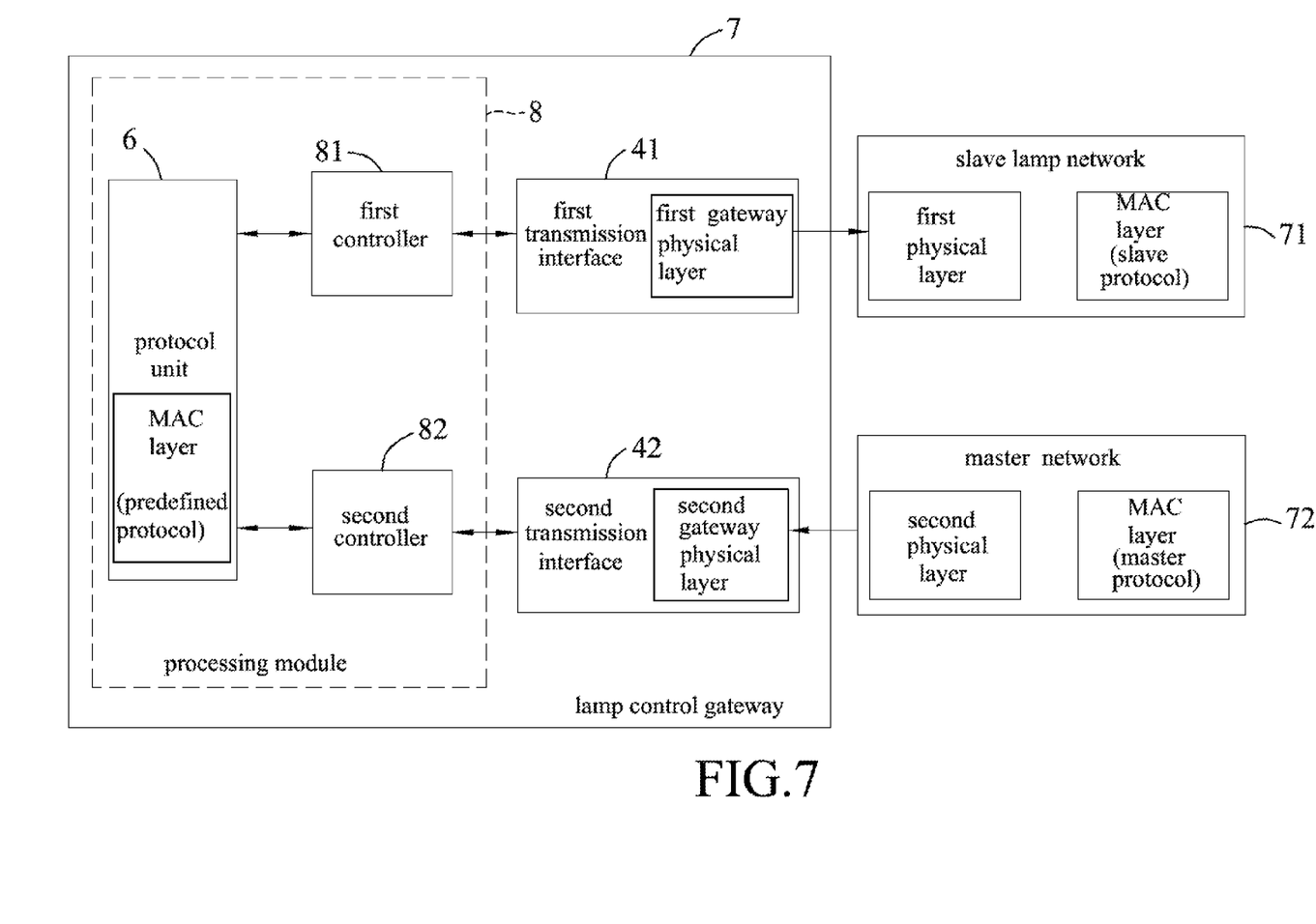
FIG. 7 is a block diagram illustrating a third embodiment of a lamp control system according to the disclosure.

Referring to FIG. 7, a third embodiment of a lamp control system according to the disclosure is a modification of the second embodiment, and differs from the second embodiment in that at least one slave lamp network 71 is used to replace the first lamp network 31 (see FIG. 6), and that at least one master network 72 is used to replace the second lamp network 32 (see FIG. 6).

In this embodiment, the slave lamp network 71 is configured to emit light, and includes a first physical layer. The master network 72 includes a second physical layer different from the first physical layer, and is configured to send a command set. The processing module 8 is configured to receive the command set from the master network 72 through the second transmission interface 42, converts the command set in such a way that a converted command set complies with a predefined protocol, and transmits the converted command set to the slave lamp network 71 through the first transmission interface 41.

Figure 8:
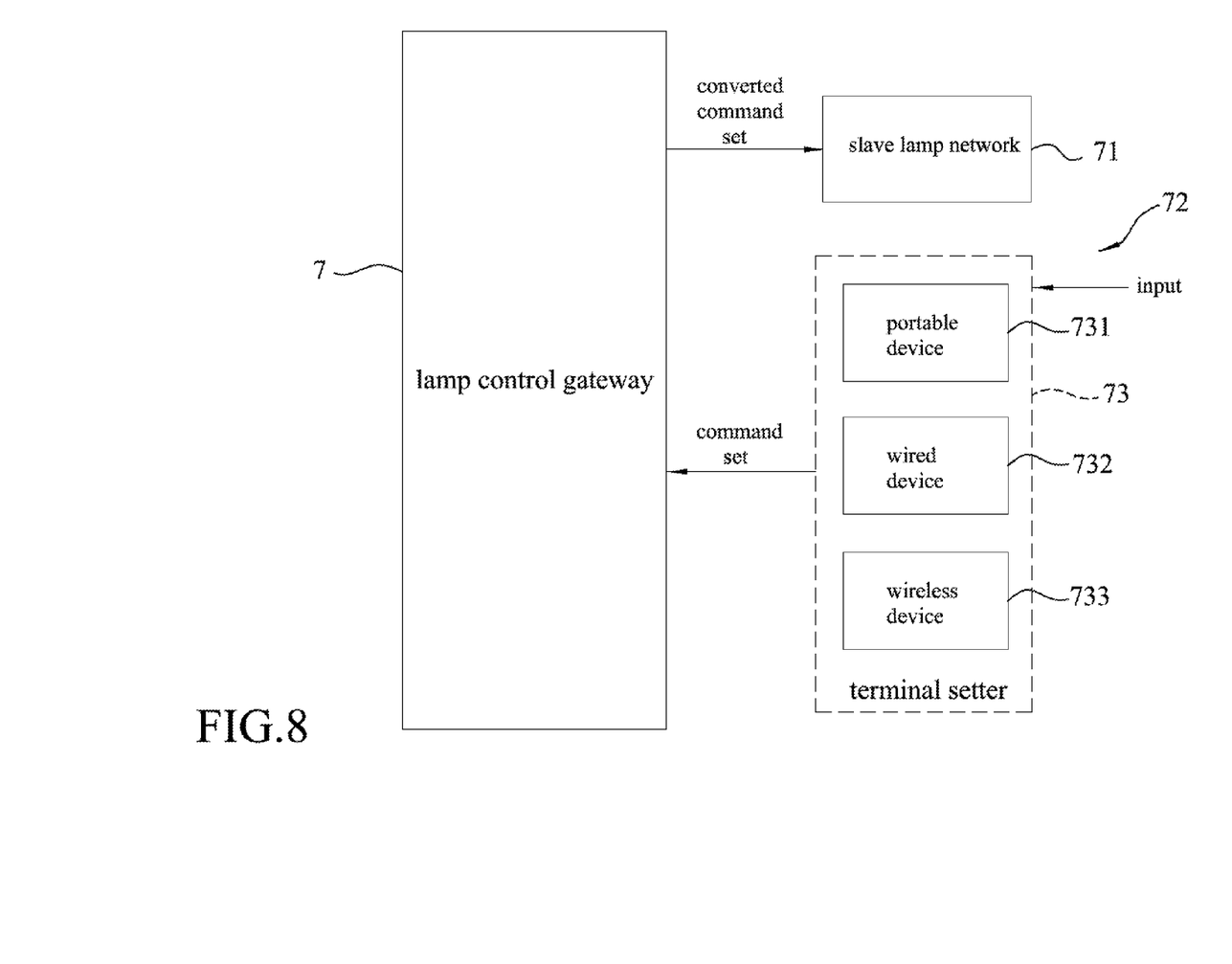
FIG. 8 is a block diagram illustrating a master network of the lamp control system of the third embodiment.

As shown in FIG. 8, the master network 72 may include a terminal setter 73 for outputting the command set based on an input, and the terminal setter 73 may be one of a portable device 731, a wired device 732, and a wireless device 733.

The slave lamp network 71 may have a MAC layer that complies with a slave protocol, the master network 72 may have a MAC layer that complies with a master protocol different from the slave protocol, and the predefined protocol may be identical with the slave protocol. In this case, the command set that is outputted by the terminal setter 73 and that complies with the master protocol different from the slave protocol could be converted by the lamp control gateway 7 based on same protocol language information in accordance with the predefined protocol identical with the slave protocol, such that the slave lamp network 71 could execute the converted command set.

For example, in one embodiment, a master network is configured to provide control signals to the respective slave control units of each slave lamp network within a lamp control system. Such control signals may be communicated by the master network over, for example, a private, shared, and/or proprietary communications network, such as DALI or DMX, to control the slave lamp network of the system.

It will be appreciated that the master network may provide external input to various slave lamp networks of the lighting system via direct communication with the slave control unit of each device, or via indirect communication, for example, via one or more intermediary communication devices and/or I/O modules. In the embodiments using indirect communication, the I/O module may be configured to provide instructions to a slave control unit of a given lighting device, wherein the I/O module is configured, for example, as a communication port. A communication port can be configured to receive and send information in one or more of a plurality of communication protocols, which may include for example, DMX, DALI, RS-485, I2C, RS-232, the Ethernet, a proprietary protocol or other communication protocol as would be readily understood by a person skilled in the art.

A standard protocol control interface can be employed when the presets which are desired to be performed by the lighting module are complex and may not be appropriately controlled using a manual control interface. For example, a standard protocol can be DALI, DMX or other standard protocols as would be readily understood by a person skilled in the art. In one embodiment, the master network is configured to be a standard protocol controller, for example a DMX controller or a DALI controller.

The term "control protocol" is used to define a protocol by which control parameters, instructions, processes, commands, etc. may be communicated to and/or implemented by one or more lighting modules and/or devices of a lighting system (e.g., as described herein), or control interface and/or light generation module(s) thereof, either directly or indirectly, to ultimately control a luminous output of the lighting device/module(s) of the system. A control protocol as used herein may include, but is not limited to, a lighting device control process (e.g., method, process, algorithm, etc.); a data format of an input for, or an output of such a process; a set of units and/or parameter s by which the controlled output of the one or more slave lamp networks, or of its one or more constituents, may be defined; a communication protocol by which such parameters, inputs and/or outputs may be communicated between various components and/or modules of a given lighting system; a proprietary or industry standard for defining various control parameters, communicating such parameters between various components/modules of a control system and/or operating and interfacing with such components for the implementation of a control sequence or process, for example. It will be appreciated that such control protocol s may be implemented to control various elements and/or functions of the one or more slave lamp networks (e.g., lighting device intensity, chromaticity, spectral power distribution, colour quality or rendering ability, luminous efficacy, wall-plug efficiency, etc.), such as via one or more control interfaces and/or light generation modules integrated therein or operatively coupled thereto, as well as provide administrative control of the control interface module(s), light generation module(s), and/or other such firmware/software modules (e.g., system update and/or upgrade, etc.).

Figure 9:
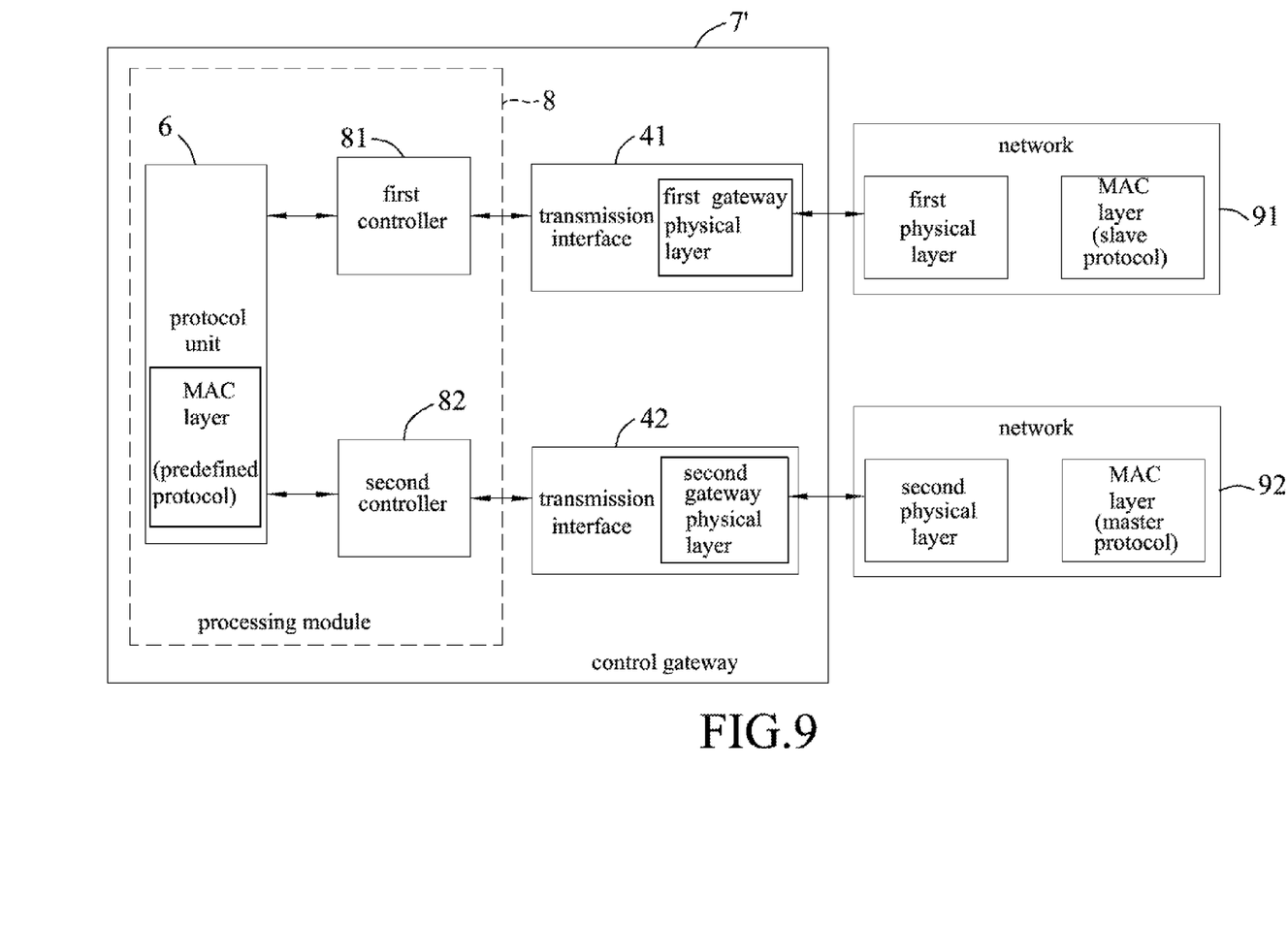
FIG. 9 is a block diagram illustrating an embodiment of a control system according to the disclosure.

Referring to FIG. 9, an embodiment of a control system according to the disclosure is a modification of the second embodiment of the lamp control system, and differ s from the second embodiment of the lamp control system in that a plurality of networks (e.g., networks 91, 92 in FIG. 9) are used to replace the first lamp network 31 (see FIG. 6) and the second lamp network 32 (see FIG. 6), and that a control gateway 7' is used to replace the lamp control gateway 7 (see FIG. 6).

In this embodiment, at least one of the networks (e.g., the network 91 in FIG. 9) includes a physical layer (e.g., a first physical layer in FIG. 9) different from that (e.g., a second physical layer in FIG. 9) of each of remaining one(s) of the networks (e.g., the network 92 in FIG. 9), and is configured to send a command set.

In one exemplary implementation of this embodiment, the at least one of the networks (e.g., the network 91 in FIG. 9) may have a MAC layer that complies with a first protocol, the remaining one(s) of the networks (e.g., the network 92 in FIG. 9) may have a MAC layer that complies with a second protocol different from the first protocol, and the predefined protocol may be identical with one of the first and second protocols.

In another exemplary implementation of this embodiment, the at least one of the networks (e.g., the network 91 in FIG. 9) may have a MAC layer that complies with a first protocol, the remaining one(s) of the networks (e.g., the network 92 in FIG. 9) may have a MAC layer that complies with a second protocol different from the first protocol, and the predefined protocol may be different from the first and second protocols.

Figure 10:
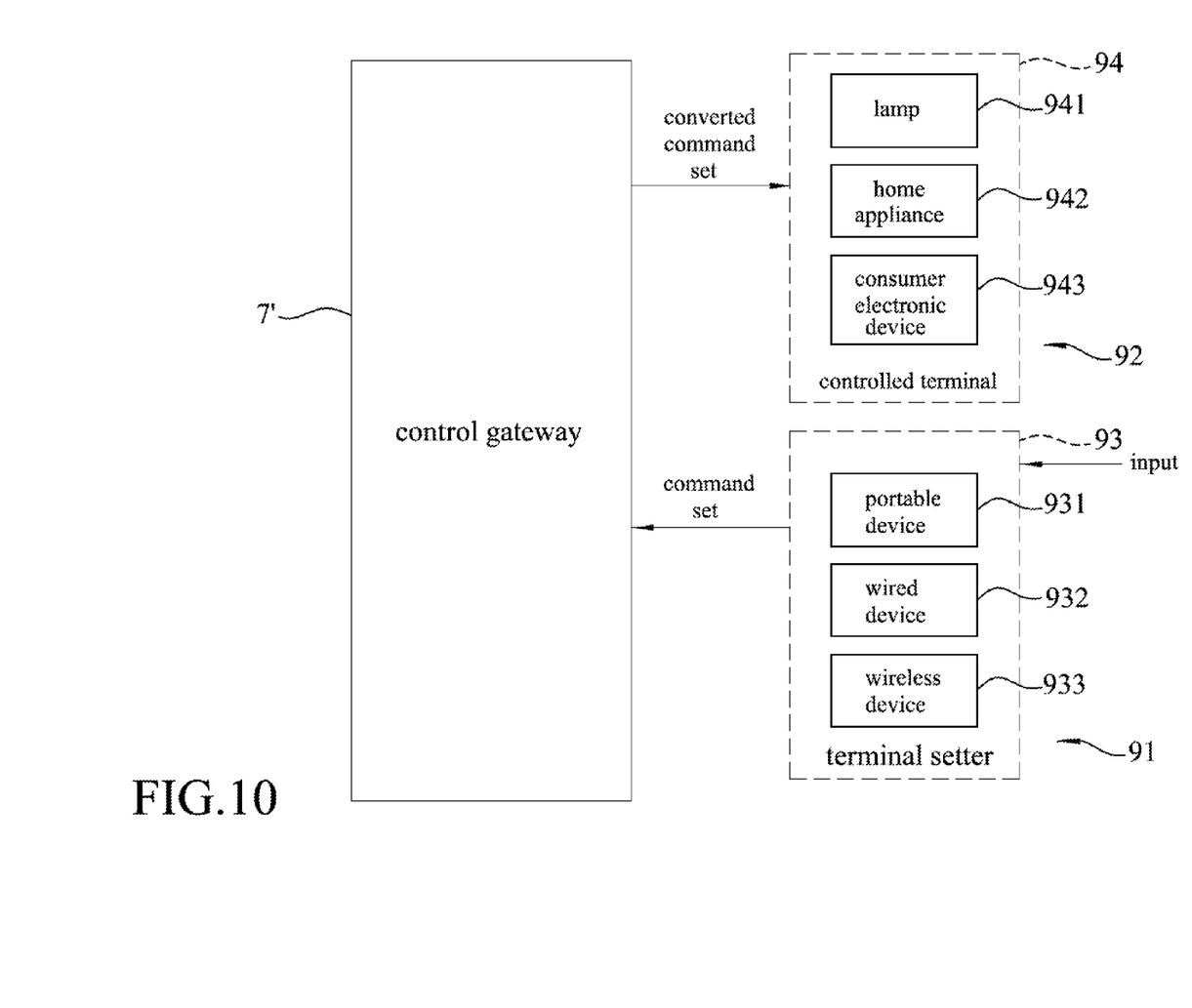
FIG. 10 is a block diagram illustrating networks of the control system of the embodiment.

As shown in FIG. 10, the at least one of the networks (e.g., the network 91 in FIG. 9) may include a terminal setter 93 for outputting the command set based on an input. The terminal setter 93 may be one of a portable device 931, a wired device 932 and a wireless device 933. At least one of the remaining one (s) of the networks (e.g., the network 92 in FIG. 9) may include a controlled terminal 94 for receiving the converted command set, and for executing the converted command set. The controlled terminal 94 may be one of a lamp 941, a home appliance 942 and a consumer electronic device 943. Since power lines exist in houses and public environments, the power lines could be used for signal transmission between the control gateway 7' and the terminal setter 93 and between the control gateway 7' and the controlled terminal 94. The control gateway 7' could communicate through the power lines with the terminal setter 91 or the controlled terminal 94 that complies with a standard of, for example, DALI, DMX, CAN or RS-485 and that does not include converters which are paired with the terminal setter 91 or the controlled terminal 94. This is advantageous in realizing Internet of Things (IoT) service over the power lines that have now existed, without setting up Internet or Intranet in advance.

In view of the above, each of the aforesaid embodiments has the following advantages:

1. Signals, messages or command sets are transmitted via multiple types of transmission media.

2. Since converters are not required, hardware cost is relatively low, and the timing requirement of the lamp control standard between different-protocol networks can be met easily.

3. Since the (lamp) control gateway 4, 7, 7' includes multiple transmission interfaces $4_1$-$4_n$, 41, 42 with different (gateway) physical layers, the (lamp) control gateway 4, 7, 7' can provide diverse selections in accordance with the type of physical layer in different networks.

Besides, since the control gateway 7' includes multiple transmission interfaces 41, 42 with different gateway physical layers to support networks with different type of physical layer, such as the lamp 941, the home appliance 942 or the consumer electronic device 943, the control gateway 7' can be used in realizing Internet of Things (IoT) service.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A lamp control system comprising:
   at least one first lamp network configured to emit light, including a first physical layer, and configured to transmit a first message;
   at least one second lamp network configured to emit light, including a second physical layer different from said first physical layer, and configured to transmit a second message; and
   a lamp control gateway including a processing module configured to receive the first message and the second message and to convert the first message and the second message in such a way that a first converted message and a second converted message comply with a predefined protocol;
   wherein said processing module includes a protocol unit including a media access control (MAC) layer that complies with the predefined protocol;
   wherein said first lamp network complies with a first protocol, said second lamp network complies with a second protocol, and the predefined protocol is different from the first and second protocols.

2. The lamp control system of claim 1, wherein said lamp control gateway further includes:
   at least one first transmission interface including a first gateway physical layer that complies with a standard with which said first physical layer of said first lamp network complies, and coupled between said processing module and said first lamp network; and
   at least one second transmission interface including a second gateway physical layer that complies with a standard with which said second physical layer of said second lamp network complies, and coupled between said processing module and said second lamp network;
   said processing module communicating with said first lamp network and said second lamp network respectively through said first transmission interface and said second transmission interface.

3. The lamp control system of claim 2, wherein said processing module further includes:
   at least one first controller coupled between said protocol unit and said first transmission interface; and
   at least one second controller coupled between said protocol unit and said second transmission interface;
   each of said first controller and said second controller modulating a signal from said protocol unit and outputting a modulated signal to said first transmission interface and/or said second transmission interface, and demodulating a signal from said first transmission interface and/or said second transmission interface and outputting a demodulated signal to said protocol unit.

4. A control system comprising:
   a plurality of networks, at least one of said plurality of networks includes a physical layer different from that of each of remaining ones of said plurality of networks, and is configured to send a command set; and
   a control gateway including a plurality of transmission interfaces that are respectively coupled to said plurality of networks, and a processing module that is coupled to said plurality of transmission interfaces, and that is configured to receive the command set, and to convert the command set in such a way that a converted command set complies with a predefined protocol;
   wherein said processing module includes a protocol unit including a media access control (MAC) layer that complies with the predefined protocol;
   wherein said at least one of said plurality of networks complies with a first protocol, said remaining ones of said plurality of networks comply with a second protocol, and the predefined protocol is different from the first and second protocols.

5. The control system of claim 4, wherein said at least one of said plurality of networks includes a terminal setter for outputting the command set based on an input.

6. The control system of claim 5, wherein said terminal setter is one of a portable device, a wired device, and a wireless device.

7. The control system of claim 4, wherein at least one of said remaining ones of said plurality of networks includes a controlled terminal for receiving the converted command set, and for executing the converted command set.

8. The control system of claim 7, wherein said controlled terminal is one of a lamp, a home appliance and a consumer electronic device.

* * * * *